J. McC. GUNN.
FIELD KITCHEN.
APPLICATION FILED NOV. 16, 1916.

1,244,489.

Patented Oct. 30, 1917.
3 SHEETS—SHEET 1.

INVENTOR:
John McClary Gunn

J. McC. GUNN.
FIELD KITCHEN.
APPLICATION FILED NOV. 16, 1916.

1,244,489.

Patented Oct. 30, 1917.
3 SHEETS—SHEET 2.

INVENTOR:
John McClary Gunn
by H. J. S. Dennison
Atty.

UNITED STATES PATENT OFFICE.

JOHN McCLARY GUNN, OF LONDON, ONTARIO, CANADA, ASSIGNOR TO THE McCLARY MANUFACTURING CO., OF LONDON, ONTARIO, CANADA.

FIELD-KITCHEN.

1,244,489.  Specification of Letters Patent.  Patented Oct. 30, 1917.

Application filed November 16, 1916. Serial No. 131,756.

*To all whom it may concern:*

Be it known that I, JOHN McCLARY GUNN, a subject of the King of Great Britain, and resident of the city of London, county of Middlesex, in the Province of Ontario, in the Dominion of Canada, have invented certain new and useful Improvements in Field-Kitchens, as described in the following specification and illustrated in the drawings that form part of the same.

The principal objects of the invention are, to provide the maximum effective cooking space for the preparation of food in army service, and to devise a form of kitchen in which heat is distributed in a most effective manner.

A further object is to arrange the parts so as to facilitate the work in the preparation of the meals, providing baking accommodation at one end of the apparatus and boiling accommodation at the other with means for regulating the one or the other independently.

The principal feature of the invention consists in the novel construction and arrangement of parts, whereby the food containers in which food to be cooked are subjected to the heating influence of a fire centrally arranged in one end of the apparatus and the baking oven and a water supply are heated by a separate fire.

In the drawings, Figure 1 is a right hand side elevation of a field kitchen constructed in accordance with this invention.

Like numerals of reference indicate corresponding parts in each figure.

Figure 1:
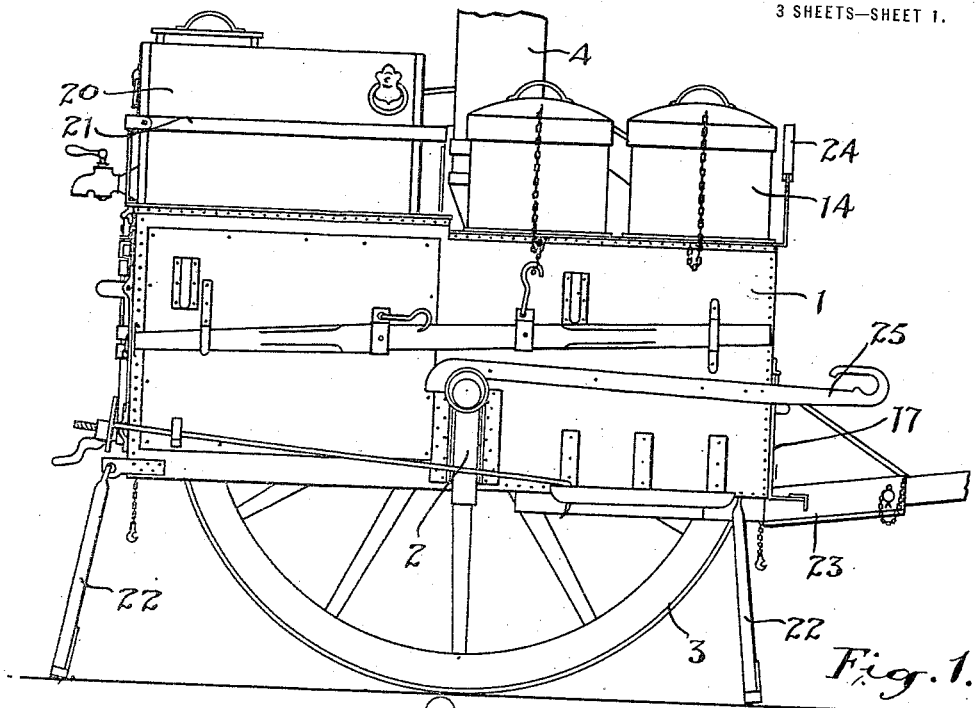
Figure 2:
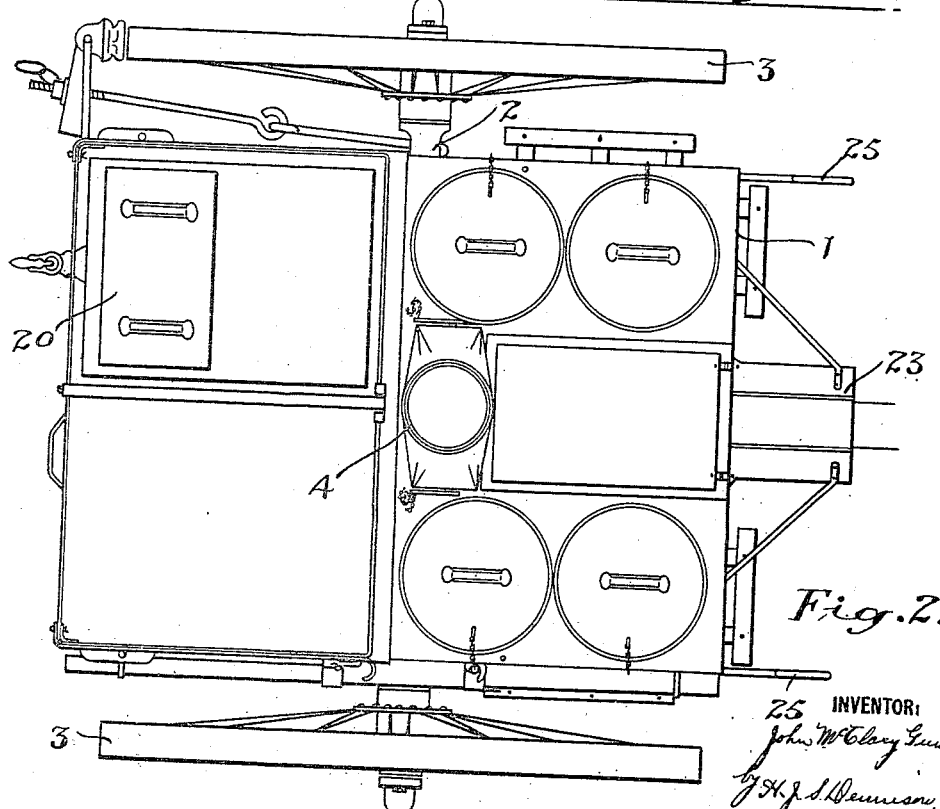
Fig. 2 is a top plan view.
Figure 3:
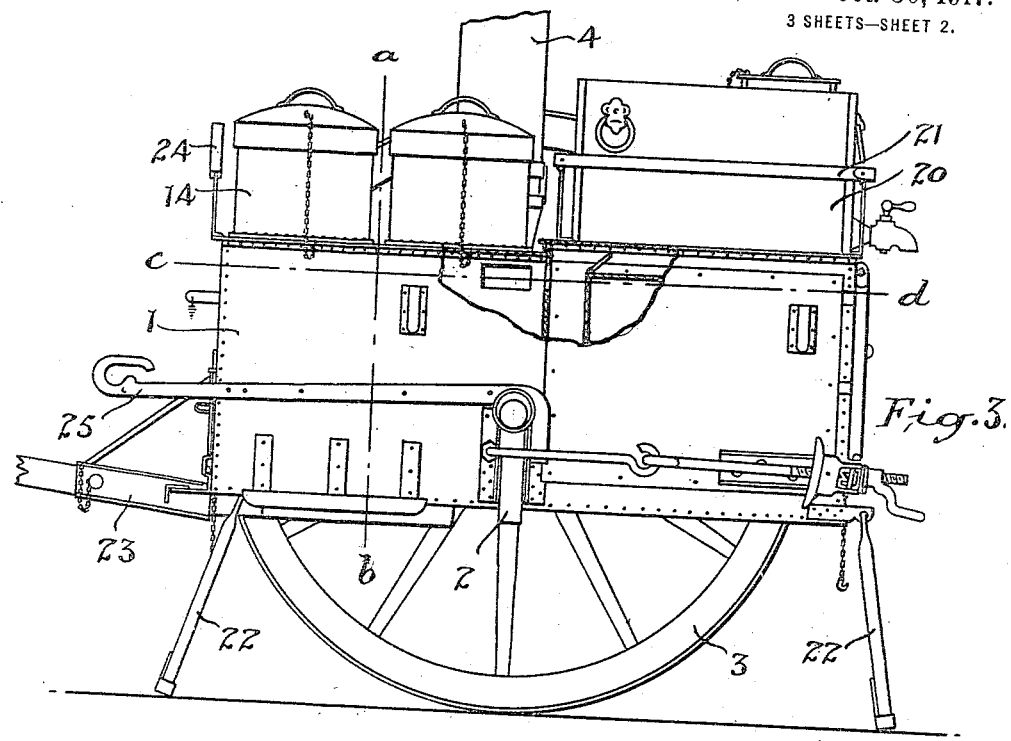
Fig. 3 is a left hand side elevation.
Figure 4:
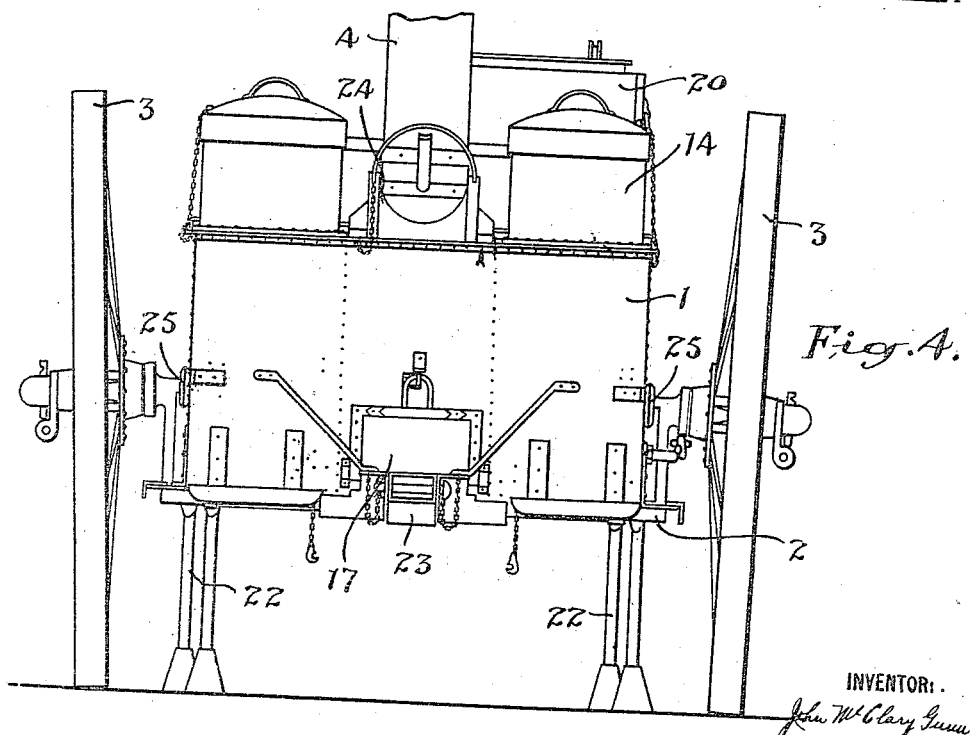
Fig. 4 is a front elevational view.
Figure 5:
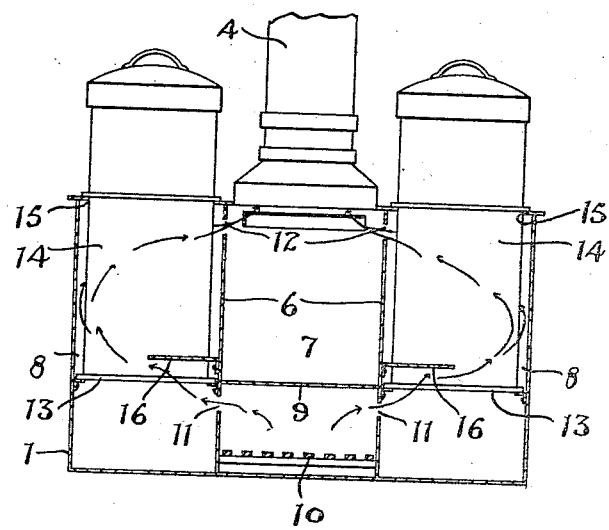
Fig. 5 is a vertical cross sectional view through the line $a$—$b$ of Fig. 3.
Figure 6:
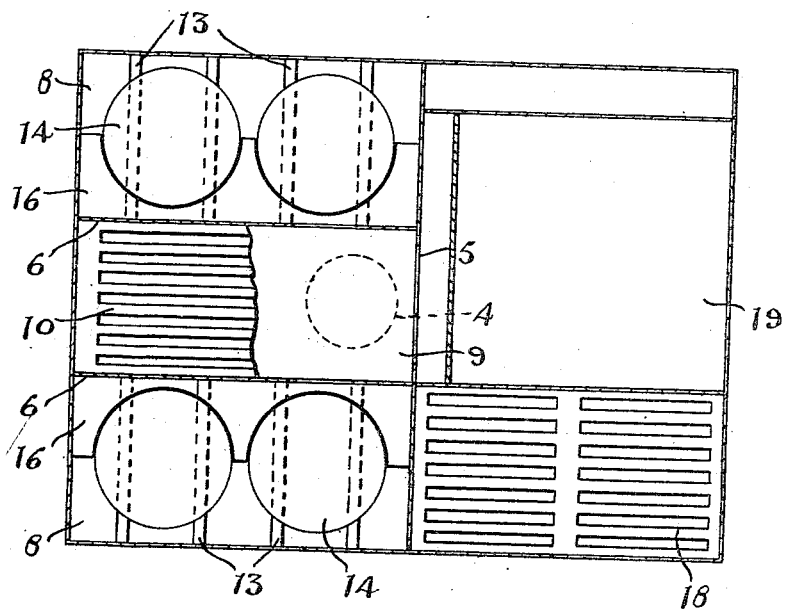
Fig. 6 is a horizontal sectional view through the line $c$—$d$ of Fig. 3.

The device is formed of a rectangular shaped casing 1 carried on an axle 2 supported upon the wheels 3.

A smoke pipe 4 is arranged centrally at the top and the casing is divided perpendicularly by a transverse partition 5 extending from the top to the bottom. The forward compartment is divided by a pair of partitions 6 forming a central chamber 7 which communicates with the smoke pipe and side chambers 8. The central chamber 7 is divided midway of its height by a plate 9 and the lower portion of the chamber is provided with grates 10 in the bottom and forms a fire-box.

11 are openings formed in the partitions 6 opening from each side of the firebox below the plate 9 and communicating with the side chambers 8. The gases of combustion flow outwardly through these openings into the chambers 8 and passing upwardly find egress through the openings 12 arranged at the top of the chambers 8 and communication with the upper central chamber 7, the gases flowing from here to the smoke pipe.

13 are bars extending transversely across the side chambers 8 and arranged immediately above the level of the top of the openings 11. These bars are adapted to support the food containers 14 which are inserted through the openings 15 in the top of the casing 1.

Baffle plates 16 are secured to the partitions 6 and extend into the chambers 8 to partly surround the containers so that the gases of combustion entering the chambers through the openings 11 will be forced to pass completely around the outer sides of the food containers, thus obtaining the maximum results from the fuel.

The top of the central chamber 7 is covered with a suitable cast plate and provides an excellent heating surface which may be utilized for keeping articles hot when the kitchen is stationary.

The firebox is provided with a suitable door 17 at the front end. The rear portion of the casing 1 is provided with a firebox 18 at one side and an oven 19 occupies the remaining space, the hot gases from the firebox passing over the top and around the outer end of the oven finding exit through a flue communicating with a space beneath the bottom as is usual in various forms of stove structures, the exit flue being connected to the smoke pipe 4.

A water reservoir 20 is arranged upon the top of the firebox and utilizes the heat of the fire to provide a supply of hot water.

A rail 21 is arranged above the top of the oven and the oven firebox structure which rail holds the water reservoir from shifting and also forms a guard for securing any utensils placed upon the top of the oven.

The kitchen is provided with swinging leg members 22 which are held in a raised position while the vehicle is being transported from place to place and which are dropped to rest upon the ground when the vehicle is stationary. A pole socket 23 is arranged at the forward side of the device into which a pole for a draft team may be inserted or to which a perch may be secured for connecting the device to a limber. The smoke pipe is preferably hinged to swing into a horizontal position and a suitable rest 24 is arranged at the forward end.

25 are draft hooks secured to the sides of the casing 1 to which suitable draft attachments may be secured for pulling the vehicle and suitable brakes 26 are also provided.

A kitchen such as described provides an extraordinary amount of cooking space and the special arrangement of the forward section so distributes the heat as to obviate the overheating of any portions of the food containers.

What I claim as my invention is:—

1. In a field kitchen, a rectangular casing supported on wheels and having a division wall arranged intermediate of its length extending from bottom to top, the portion at one side of said partition containing an oven and a firebox arranged at one side of the oven, said oven and firebox having doors opening from one end of the casing, the portion of the casing at the other side of said partition containing a firebox centrally arranged and opening from the end opposite to the oven and compartments arranged each side of said central firebox and having the gases of combustion passing therethrough, said side compartments having openings in the top, food containers removably arranged in said openings in the side compartments, means for directing the gases of combustion around said containers, and a smoke flue connected with both fireboxes.

2. A field kitchen, comprising, a rectangular casing divided transversely, one end thereof having longitudinally arranged partitions forming a central chamber and side compartments, a grate arranged in said central chamber, a horizontal plate dividing said central chamber transversely, flue passages leading outwardly from the fire box below said plate and communicating with said side compartments, bar supports arranged in said side compartments above said flue passages, flue passages leading from the top of said side compartments to the central passage above the fire box, removable food containers supported within said side compartments upon the transversely arranged bars, means for circulating the gases of combustion upwardly around said food containers, and a smoke pipe adapted to carry off the waste gases after heating the food containers.

3. A field kitchen, comprising, a rectangular casing divided transversely, one end thereof having longitudinally arranged partitions forming a central chamber and side compartments, a grate arranged in said central chamber, a horizontal plate dividing said central chamber transversely, flue passages leading outwardly from the firebox below said plate and communicating with said side compartments, bar supports arranged in said compartments above said flue passages, flue passages leading from the top of said side compartments to a passage above the firebox, removable food containers supported upon said bar supports within said side compartments, baffle plates arranged within said side compartments and extending partially around said food containers from the inner sides of the compartment and arranged between the upper and lower flue passages of said compartments and directing the gases around the outer sides of the food containers, and a smoke pipe leading from the central compartment above the firebox.

JOHN McCLARY GUNN.

Copies of this patent may be obtained for five cents each, by addressing the "Commissioner of Patents, Washington, D. C."